United States Patent [19]
Sato et al.

[11] Patent Number: 5,229,827
[45] Date of Patent: Jul. 20, 1993

[54] IMAGE RECORDING APPARATUS WITH SHEET STACKERS

[75] Inventors: Toshio Sato, Fujisawa; Chiaki Ohigashi, Yokohama, both of Japan

[73] Assignee: Matsushita Graphic Communication Systems, Inc., Tokyo, Japan

[21] Appl. No.: 831,914

[22] Filed: Feb. 6, 1992

[30] Foreign Application Priority Data

Feb. 7, 1991 [JP] Japan .................................. 3-016314

[51] Int. Cl.⁵ .......................................... G03G 21/00
[52] U.S. Cl. ...................... 355/321; 355/310; 355/311; 355/323; 270/21.1; 101/224; 101/226; 242/75.4; 83/104; 83/105; 83/408; 358/304
[58] Field of Search ............... 355/310, 311, 313, 308, 355/309, 321, 323; 358/304; 270/20.1, 21.1; 101/224–227; 83/408, 104, 107, 105, 106; 242/55, 75.4

[56] References Cited

U.S. PATENT DOCUMENTS

| | | | |
|---|---|---|---|
| 2,318,937 | 5/1943 | Goldney et al. | 83/106 |
| 2,793,662 | 5/1957 | Öholun | 83/106 X |
| 2,978,941 | 4/1961 | Geiszler et al. | 83/106 |
| 3,830,121 | 8/1974 | Makeev et al. | 84/104 X |
| 4,593,893 | 6/1986 | Suter | 101/226 X |
| 4,700,906 | 10/1987 | Lapadakis | 242/75.4 X |
| 4,717,087 | 1/1988 | Keene et al. | 242/75.4 |
| 4,721,058 | 1/1988 | Hayamizu et al. | 358/304 X |
| 4,915,319 | 4/1990 | Gerber | 242/75.4 X |
| 4,984,029 | 1/1991 | Nishikawa | 355/310 |
| 5,025,725 | 6/1991 | Fukino | 101/224 X |
| 5,172,238 | 12/1992 | Kuboki | 358/304 X |
| 5,173,785 | 12/1992 | Muramatsu | 355/321 X |

FOREIGN PATENT DOCUMENTS 0225668 12/1984 Japan .................................. 358/304

Primary Examiner—A. T. Grimley
Assistant Examiner—Matthew S. Smith
Attorney, Agent, or Firm—Pollock, VandeSande & Priddy

[57] ABSTRACT

An electrostatic plotter includes a housing having a side to be confronted by an operator. A recording head is disposed in the housing for recording a latent image on a recording paper supplied from a roll of recording paper disposed in the housing near the operator side. The latent image recorded on the recording paper is developed into a visible image by a developing unit in the housing. A cutting unit cuts off a sheet with the developed visible image thereon from the recording paper and discharges the cut sheet toward the operator side of the housing. A control unit controls the cutting unit and issues a size signal indicative of the size of each of sheets cut off by the cutting unit. A plurality of stackers are positioned on a discharge side of the cutting unit and operable to sort and store the cut sheets in response to the size signal.

7 Claims, 13 Drawing Sheets

IMAGE RECORDING APPARATUS WITH SHEET STACKERS

BACKGROUND OF THE INVENTION

1. Field of the Invention:

The present invention relates to an image recording apparatus having sheet stackers for storing discharged sheets of recording paper.

2. Description of the Prior Art:

One conventional image recording apparatus in the form of an electrostatic plotter is shown in FIGS. 18 and 19 of the accompanying drawings. As shown in FIG. 18, the electrostatic plotter has a roll 1 of electrostatic recording paper for supplying an elongated continuous recording paper, a recording head 2 for recording an electrostatic latent image on the recording paper, a developing unit 3 for developing the latent image into a visible image, a pair of upper and lower feed rollers 4 for drawing the recording paper from the roll 1 through the developing unit 3 and feeding the recording paper with the developed visible image thereon, and a cutting unit 5 for cutting the recording paper into a sheet with the visible image recorded thereon.

The cutting unit 5 comprises a pair of inlet rollers 6 positioned near a paper inlet for introducing the recording paper into the cutting unit 5, a pair of feed rollers 7 for feeding the cut sheet through the cutting unit 5, a pair of discharge rollers 8 for discharging the sheet out of the cutting unit 5 in an X direction which is the longitudinal direction of the recording paper, a Y-direction cutter 9 for cutting off the recording sheet in a Y direction which is the transverse direction of the recording sheet perpendicular to the X direction, and an X-direction cutter (not shown) for cutting off the recording paper in the X direction. The cutting unit 5 is mounted on an upper frame which is pivotally movable about a hinge 10 so that it can angularly move upwardly away from the plotter proper when the roll 1 is to be replaced, as shown in FIG. 19.

The electrostatic plotter also includes a sheet guide 11 for guiding sheets discharged from the cutting unit 5.

The electrostatic plotter operates as follows: First, the upper frame on which the cutting unit 5 is mounted are angularly moved upwardly as shown in FIG. 19, and a roll 1 of electrostatic recording paper is set in place in the plotter proper by the operator who is standing on the lefthand side (as viewed in FIG. 19) of the plotter. Then, the operator pulls the recording sheet from the roll 1 and guides the recording paper through the recording head 2 and the developing unit 3 until the leading end of the recording paper extends a certain length from the lower feed roller 4. The operator lowers the cutting unit 5 down against the plotter proper, and places the leading end of the recording paper between the inlet rollers 6 of the cutting unit 5. The electrostatic plotter is now ready to record desired image on the recording paper. In a recording process, an electrostatic latent image is formed on the recording paper by the recording head 2, and then developed into a visible image by the developing unit 3. The recording paper is then fed by the feed rollers 4 and introduced into the cutting unit 5 by the inlet rollers 6. In response to a command for cutting off the recording paper in the Y direction, the inlet rollers 6, the feed rollers 7, and the discharge rollers 8 are stopped, and the Y-direction cutter 9 moves in the Y direction to cut off the recording paper into a sheet of a selected length with the developed image carried thereon. Thereafter, the feed rollers 7 and the discharge rollers 8 are rotated to discharge the cut sheet out of the cutting unit 5. The discharged sheet is guided by the sheet guide 11 so that it can readily be picked up by the operator. Then, the inlet rollers 6 are rotated again. To cut off the recording sheet to a desired width, the X-direction cutter is moved in the X direction while the inlet rollers 6, the feed rollers 7, and the discharge rollers 8 are in operation.

To supply the plotter with new recording paper, it is necessary to set a new roll 1 of recording paper in the plotter proper. Usually, an unused roll 1 of recording paper has a weight of about 10 kg. Therefore, it requires considerably heavy labor for the operator to place a new roll 1 of recording paper into the plotter because the roll 1 has to be set in place far away from the side of the plotter where the operator is standing. Cut sheets are discharged from the cutting unit 5 to the side of the plotter that is remote from the operator. Accordingly, spaces wide enough for the operator to freely get in and out of should be provided on the opposite sides of the plotter. This space requirement poses a limitation on the location where the plotter can be installed. Another problem is that cut sheets are discharged into one place without being sorted. Therefore, it is necessary for the operator to sort the discharged sheets according to size or to sort out any unrecorded waste sheets between recorded images.

SUMMARY OF THE INVENTION

In view of the aforesaid problems of the conventional image recording apparatus, it is an object of the present invention to provide an image recording apparatus which allows the operator to remove and sort cut sheets easily and which can be installed with less space limitations.

According to the present invention, there is provided an electrostatic image recording apparatus for recording an image on a roll of recording paper, comprising a housing having a side to be confronted by an operator, a recording head disposed in the housing for recording a latent image on a recording paper supplied from a roll of recording paper disposed in the housing near said side, a developing unit disposed in the housing for developing the latent image recorded on the recording paper into a visible image, and a cutting unit mounted on the housing for cutting off a sheet with the developed visible image thereon from the recording paper and discharging the cut sheet toward said side of the housing.

According to the present invention, there is also provided an electrostatic image recording apparatus for recording an image on an elongated recording paper, comprising a roll of recording paper which is rotatable about its own axis for supplying the elongated recording paper, a brake mechanism for applying a braking force to brake the roll against rotation, image recording means for forming a recorded image on the elongated recording paper supplied from the roll, a feed roller for feeding the elongated recording paper with the recorded image thereon, and manual drive means for selectively applying a manual force to rotate the feed roller to feed the elongated recording paper, the manual force being smaller than the braking force.

According to the present invention, there is further provided an electrostatic image recording apparatus for recording an image on an elongated recording paper, comprising image recording means for forming recorded images on the elongated recording paper, cutting means for cutting off successive sheets from the elongated recording paper, and a plurality of stackers for sorting and storing sheets cut off by the cutting means.

The plurality of stackers include a stacker for storing sheets cut off by the cutting means in excess of a predetermined number of sheets cut off by the cutting means and stored in another one of the plurality of stackers.

The plurality of stackers also include a stacker for storing waste sheets cut off from the elongated recording paper as image-free lengths between adjacent recorded images by the cutting means.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

FIGS. 1 through 15 show an image recording apparatus according to a first embodiment of the present invention, the image recording apparatus being in the form of an electrostatic plotter.

Figure 1:
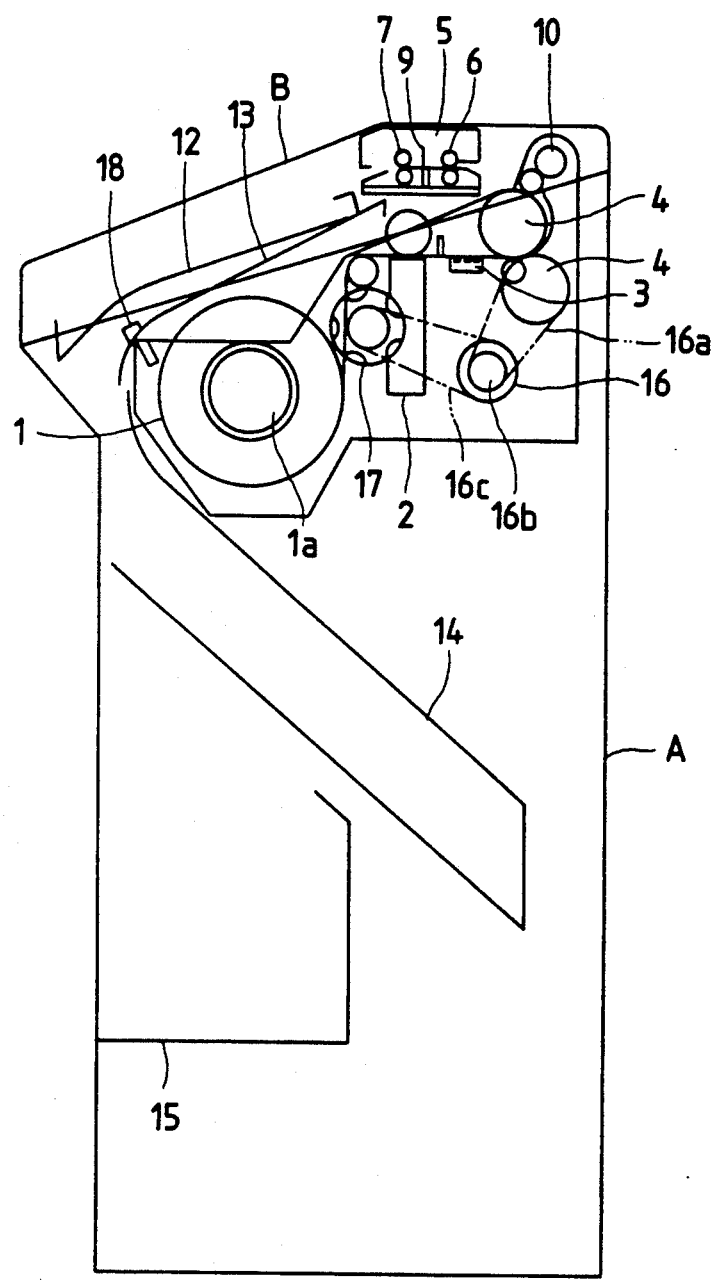
FIG. 1 is a schematic vertical cross-sectional view of an image recording apparatus according to a first embodiment of the present invention.

As shown in FIG. 1, the electrostatic plotter has a roll 1 of electrostatic recording paper which is rotatable about its own axis for supplying an elongated continuous recording paper, a recording head 2 for recording an electrostatic latent image on the recording paper, a developing unit 3 for developing the latent image into a visible image, a pair of upper and lower feed rollers 4 for drawing the recording paper from the roll 1 through the developing unit 3 and feeding the recording paper with the developed visible image thereon, and a cutting unit 5 for cutting the recording paper into a sheet with the visible image recorded thereon. The roll 1, the recording head 2, the developing unit 3, and the feed rollers 4 are accommodated in a housing A. Particularly, the roll 1 is positioned in the housing A near a front side thereof (lefthand side as viewed in FIG. 1) in front of which the operator stands in operating on and handling the electrostatic plotter.

The cutting unit 5 comprises an inlet roller assembly 6 positioned near a paper inlet for introducing the recording paper into the cutting unit 5, a feed roller assembly 7 for feeding the cut sheet through the cutting unit 5, and a Y-direction cutter 9 for cutting off the recording sheet in a Y direction which is the transverse direction of the recording sheet perpendicular to the longitudinal direction thereof. The cutting unit 5 is mounted on an upper frame B which is pivotally movable about a hinge 10. The upper frame B also supports therein a first stacker 12 and a guide 13. When the upper frame is angularly moved about the hinge 10, therefore, the cutting unit 5, the first stacker 12, and the guide 13 angularly move with the upper frame.

The first stacker 12 stores cut sheets of recording paper which are of an A3 size and smaller sizes, for example, and also waste sheets that have been cut off between recorded images. The guide 13 serves to guide cut sheets into a second stacker 14 mounted in the housing A below the roll 1, the recording head 2, the developing unit 3, and the feed rollers 4. When cut sheets of recording paper are directed to the guide 13 from the cutting unit 5, the first stacker 12 moves upwardly away from the guide 13. The second stacker 14 stores cut sheets of recording paper which are of A2, A1, A0 sizes, for example. The housing A also accommodates a margin stacker 15 disposed beneath the second stacker 14 for storing opposite longitudinal sheet margins that have been cut off by an X-direction cutter (described later on).

The electrostatic plotter also has a motor 16 for rotating the feed rollers 4 through a belt 16a trained around a motor pulley 16b and the lower feed roller 4, a manual knob 17 which will manually be turned by the operator to rotate the motor 16 through a belt 16c trained around the manual knob 17 and the motor pulley 16b, and a manual cutter 18 which is used when a recording paper is set in place at first. The roll 1 of recording paper is associated with a brake mechanism 1a which applies a braking force greater than the force that is applied to the feed rollers 4 by the manual knob 17.

Figure 2:
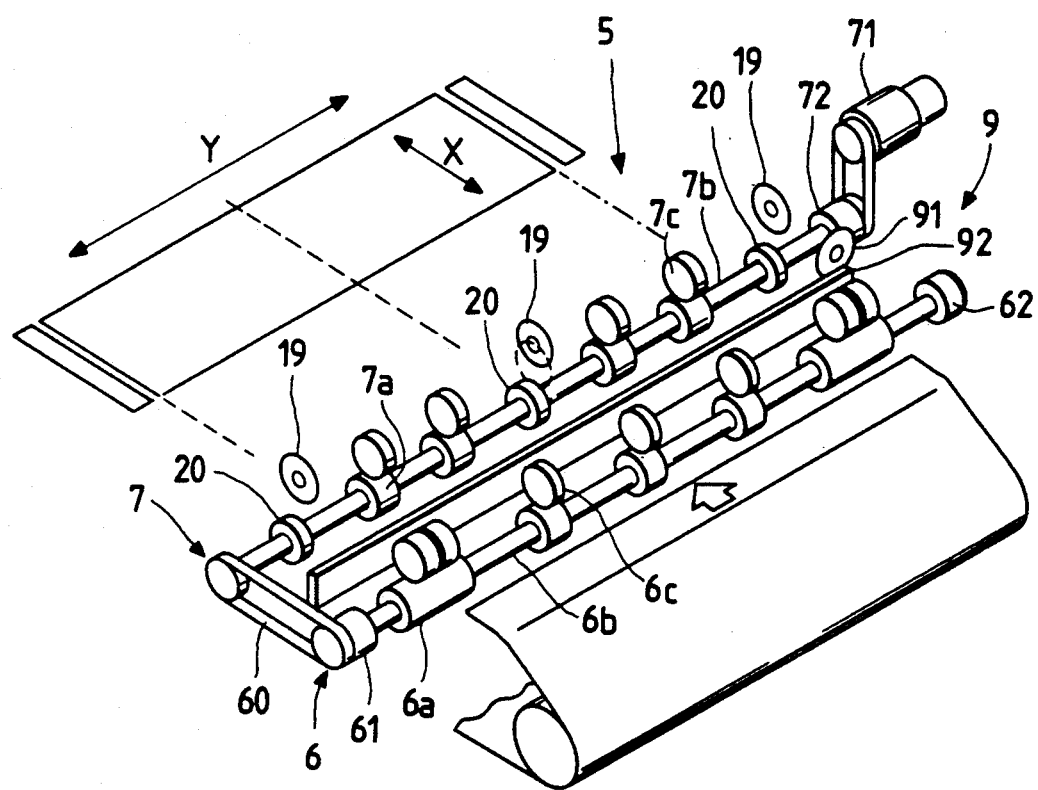
FIG. 2 is a perspective view of an internal structure of a cutting unit of the image recording apparatus shown in FIG. 1.

FIG. 2 shows an internal structure of the cutting unit 5 in detail. The inlet roller assembly 6 comprises a plurality of rollers 6a mounted on a shaft 6b and a plurality of rollers 6c associated with the respective rollers 6a. The inlet roller assembly 6 is drivable by rotative power transmitted by a belt 60 trained around one of the rollers 6a on one end of the shaft 6b. The roller 6a around which the belt 60 is trained is combined with a clutch 61 for selectively connecting and disconnecting the roller 6a and the shaft 6b. A brake 62 is mounted on the other end of the shaft 6b for braking the inlet roller assembly 6 and also the feed roller assembly 7 through the belt 60

The feed roller assembly 7 comprises a plurality of rollers 7a mounted on a shaft 7b and a plurality of rollers 7c associated with the respective rollers 7a. The belt 60 is trained around the roller 7a on one end of the shaft 7b. A motor 71 is operatively connected by a belt 70 to the roller 7a on the other end of the shaft 7b, the roller 7a being combined with a clutch 72. The clutch 72 selectively connects and disconnects the roller 7a and the shaft 7b. The Y-direction cutter 9 is disposed between the inlet and feed roller assemblies 6, 7 and extends in the Y direction. The Y-direction cutter 9 comprises a rotary cutting blade 91 movable back and forth in the Y direction while rotating about its own axis, and a fixed straight cutting blade 92 extending in the Y direction and held in engagement with the rotary cutting blade 91. The X-direction cutter is positioned near the feed roller assembly 7, and comprises a plurality of upper rotary cutting blades 19 movable downwardly into a cutting position and a plurality of lower rotary cutting blades 20 mounted on the shaft 7b for engagement with the upper rotary cutting blades 19, respectively, to cut off a sheet of recording paper to a desired width. The upper and lower rotary cutting blades 19, 20 are provided in pairs that are spaced at intervals along the shaft 7b. In the illustrated embodiment, there are three pairs of upper and lower rotary cutting blades 19, 20. However, there may be five pairs of upper and lower rotary cutting blades 19, 20 depending on the desired width of a sheet of recording paper.

Figure 3:
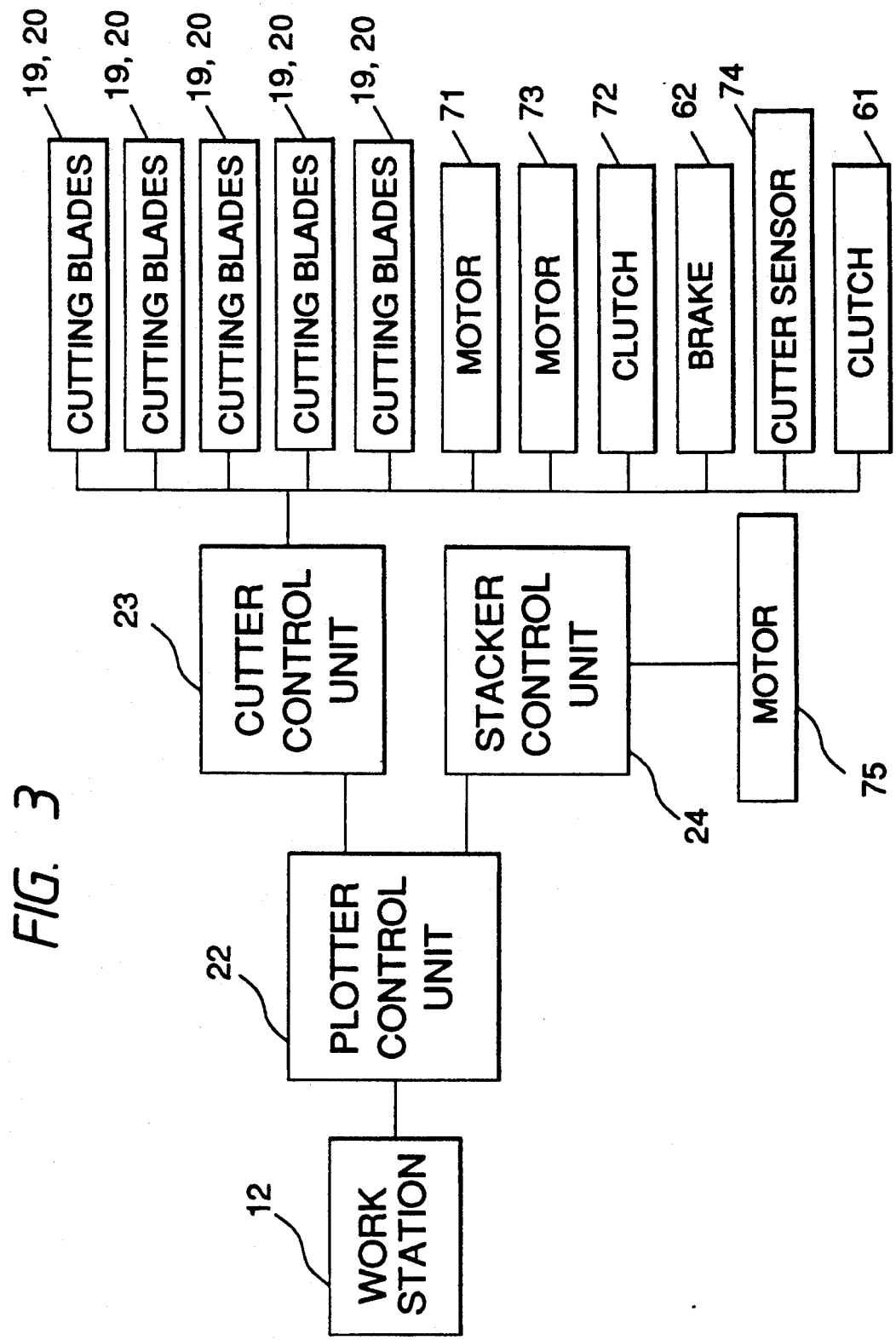
FIG. 3 is a block diagram of a control system for controlling the cutting unit and stackers of the image recording apparatus shown in FIG. 1.

FIG. 3 shows in block form a control system for controlling the cutting unit 5 and the stackers 12, 14 of the electrostatic plotter shown in FIG. 1. The control system includes a work station 21 serving to input and output graphic information, a plotter control unit 22, a cutter control unit 23, and a stacker control unit 24. The cutter control unit 23 controls X-direction cutter blade pairs 1, 2, 3, 4, 5 composed of the cutting blades 19, 20 (in case the cutting blades 19, 20 are provided in five pairs), the motor 71, a motor 73 for reciprocally moving the rotary cutting blade 91 in the Y direction, the clutch 72, the brake 62, and the clutch 61, based on commands from the plotter control unit 22 and information from a cutter sensor 74 that is positioned near the Y-direction cutter 9 and the reed roller assembly 7 and detects the leaking end of the recording paper. The stacker control unit 24 controls a sheet path selector motor 75 for vertically moving the first stacker 12 (FIG. 1) to select one of the first and second stackers 12, 14.

Figure 4:
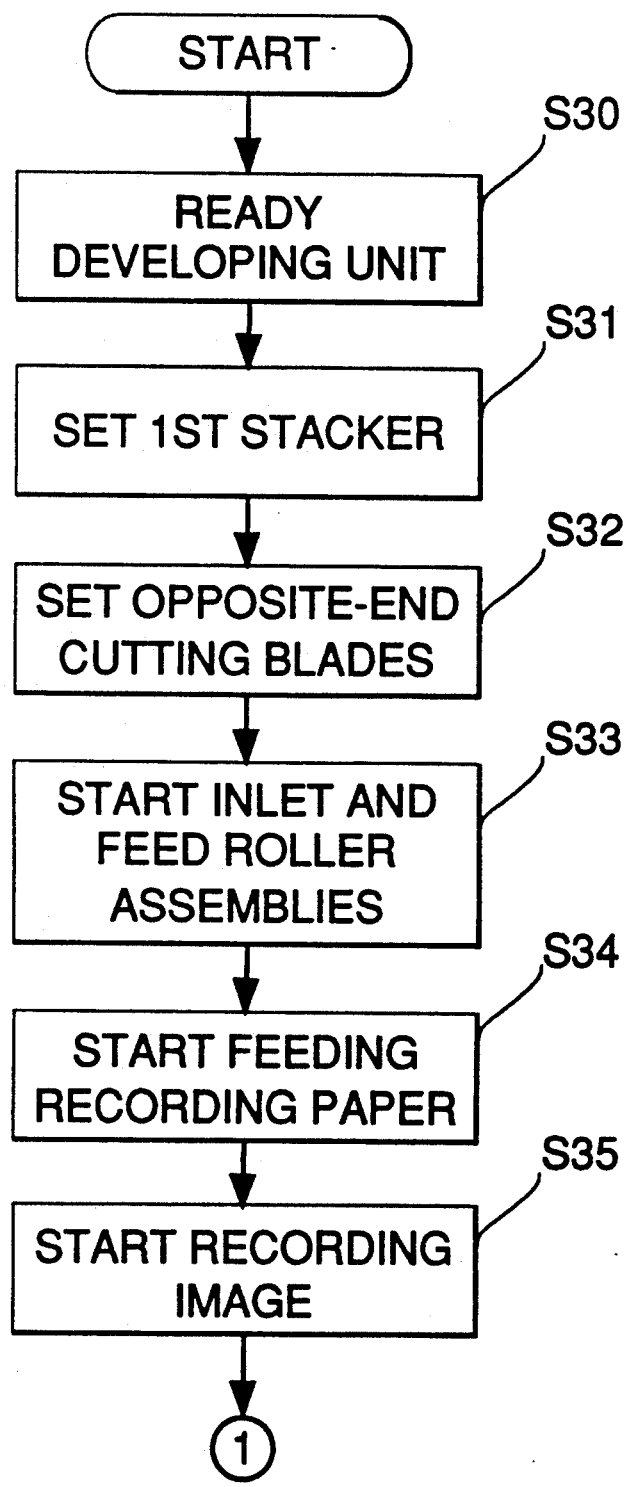
FIGS. 4, 5, and 6 are a flowchart of an operation sequence of the image recording apparatus shown in FIG. 1.
Figure 5:
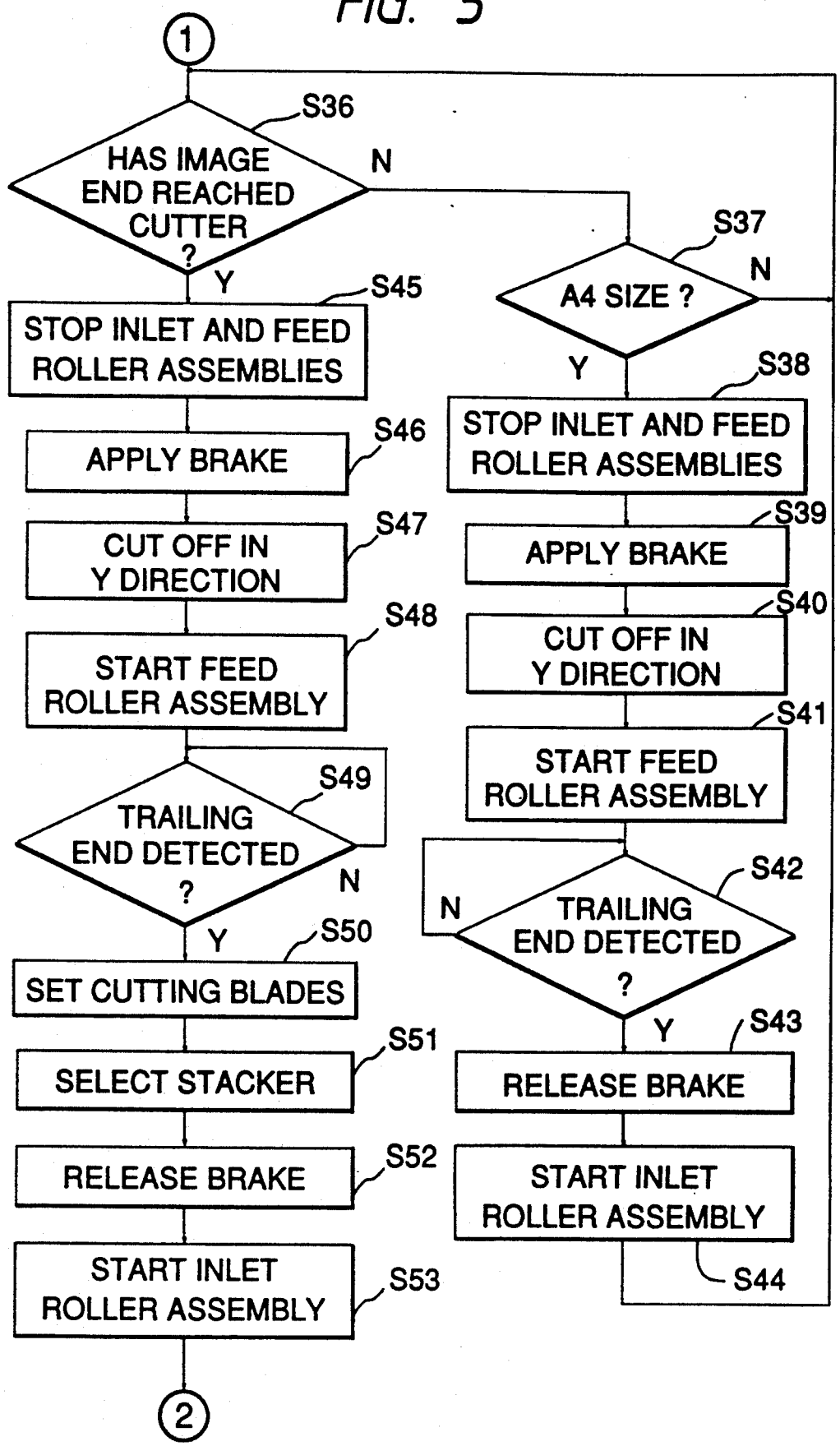

FIG. 4 through 5 show an operation sequence of the electrostatic plotter shown in FIGS. 1 through 3. FIGS. 7 through 15 show various stages of operation of the electrostatic plotter shown in FIGS. 1 through 3. Now, operation of the electrostatic plotter shown in FIGS. 1 through 3 will be described below with reference to FIGS. 4 through 15.

Figure 7:
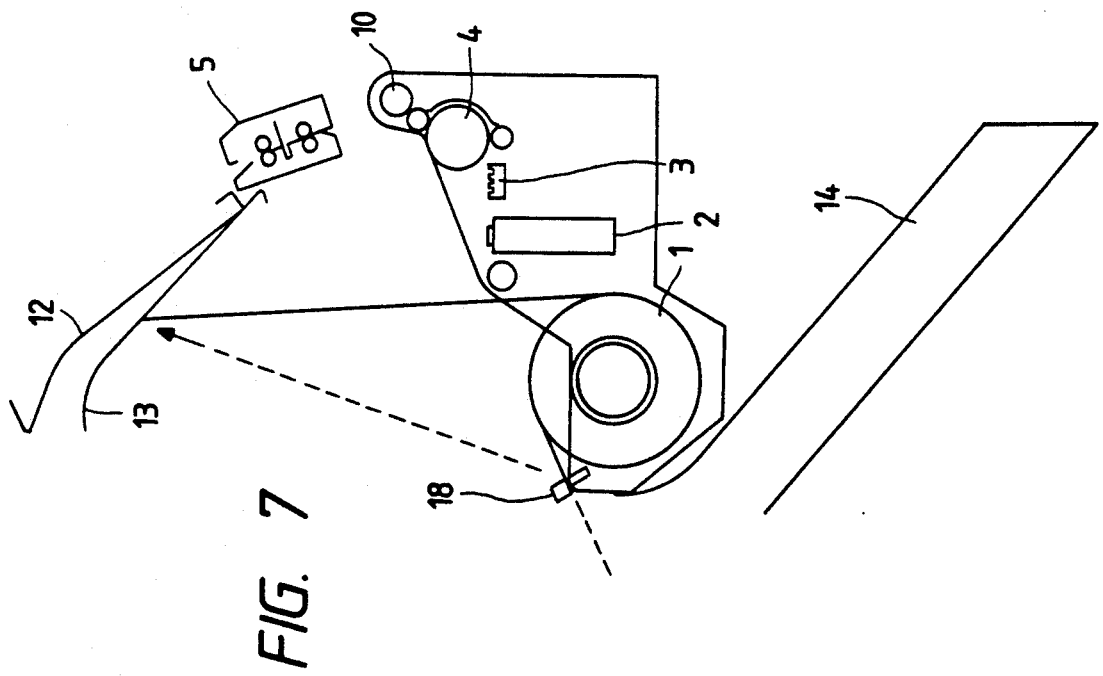
FIG. 7 is a schematic vertical cross-sectional view illustrative of the manner in which a leading end of recording paper is unwound from a roll in an initial stage.

First, a preparatory process will be described below. As shown in FIG. 7, the operator, who stands in front of the front side (lefthand side) of the electrostatic plotter, angularly moves the upper frame B (see FIG. 1) upwardly and sets a roll 1 of recording paper in place in the housing A of the electrostatic plotter. Then, the operator draws the leading end of the recording paper onto the manual cutter 18 near the roll 1, set the leading end in the manual cutter 18, and cuts off the leading end. Then, the operator pulls the leading end of the recording paper upwardly to a position against the lower surface of the guide 13 as indicated by the broken line in FIG. 7. The illustrated position against the lower surface of the guide 13 is selected such that after the withdrawn length of the recording paper is inserted between the feed rollers 4 and tightly stretched, the leading end reaches the inlet of the cutting unit 5, as described below. Alternatively, the recording paper may be marked with an indicia at such a position that the operator is only required to pull the leading end of the recording paper until the indicia appears, before the withdrawn length of the recording paper is inserted between the feed rollers 4 and tightly stretched.

Figure 8:
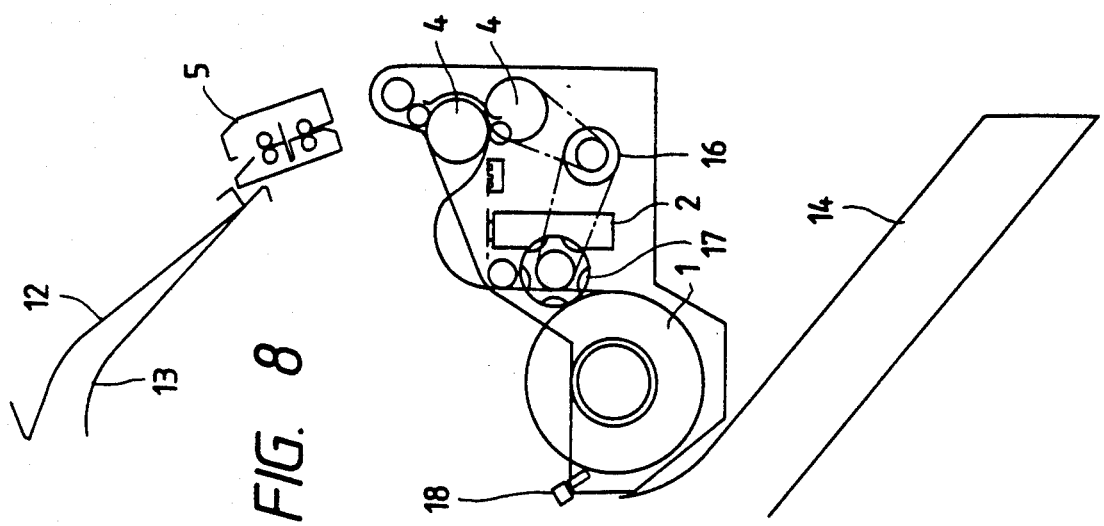
FIG. 8 is a schematic vertical cross-sectional view illustrative of the manner in which the leading end of recording paper starts being manually inserted between feed rollers in the initial stage.
Figure 9:
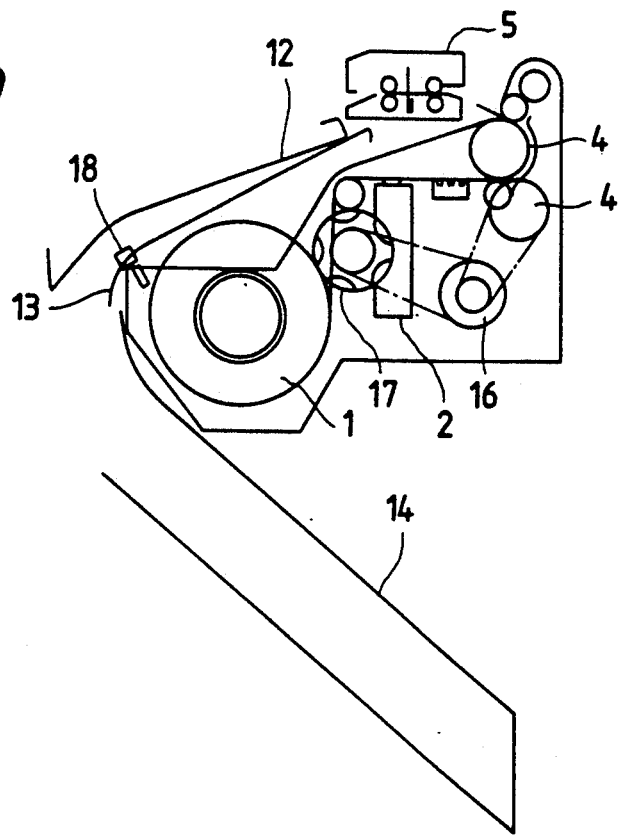
FIG. 9 is a schematic vertical cross-sectional view illustrative of the manner in which the leading end of recording paper is manually inserted fully between the feed rollers in the initial stage.
Figure 10:
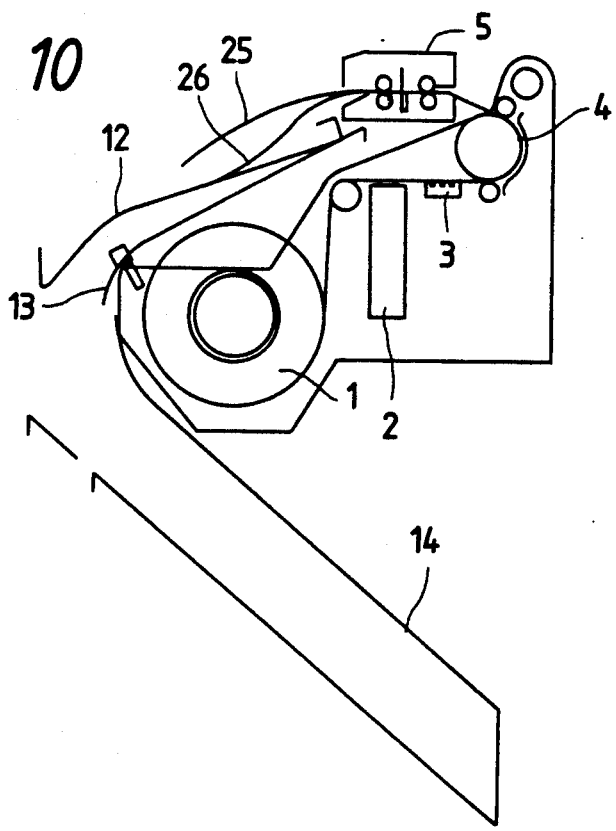
FIG. 10 is a schematic vertical cross-sectional view illustrative of the manner in which opposite longitudinal margins are cut off from a waste length of recording paper.

As shown in FIG. 8, the leading end of the recording paper is inserted between the feed rollers 4 and the manual knob 17 is manually turned to feed the recording paper until it is tightly stretched without any slack. At this time, the leading end of the recording paper reaches the inlet of the cutting unit 5, as described above. The roll 1 is normally braked under a force larger than the force tending to rotate the feedrollers 4 with the manual knob 17. Therefore, upon further rotation of the manual knob 17 after the recording paper is tightly stretched, the feed rollers 4 slip against the recording paper. The recording paper is now held under tension and aligned with its longitudinal direction, i.e., properly positioned in the lateral or transverse direction. The preparatory process is finished, and the operator lowers the upper frame B. The recording paper is in an initial condition, ready for recording images thereon, as shown in FIG. 9.

Figure 6:
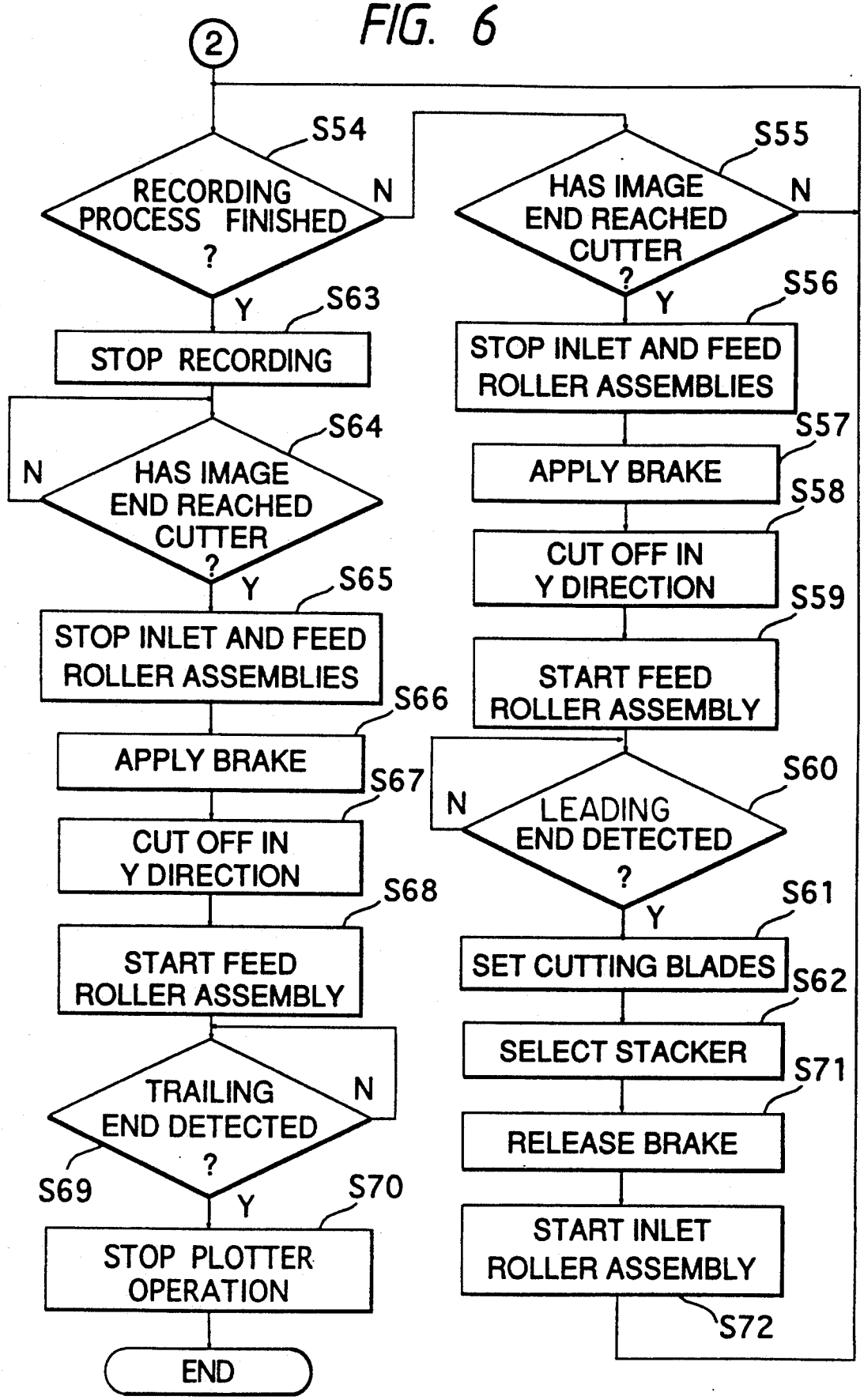

A recording process will be described below with reference to FIGS. 4 through 6. When a recording start signal is given to the electrostatic plotter, a step S30 (FIG. 4) confirms that the developing unit 3 is filled with a developing solution, and readied for developing latent images. The first stacker 12 is set in a position shown in FIG. 10 for receiving a discharge sheet of recording paper from the cutting unit 5 in a step S31. The upper rotary cutting blades 19 on the opposite ends are set in position, i.e., lowered, for cutting off opposite longitudinal margins of the recording paper in a step S32. Then, the inlet and feed roller assemblies 6, 7 of the cutting unit start rotating as by engaging the clutches 61, 72 in a step S33, and the feed rollers 4 start rotating to begin feeding the recording paper in a step S34.

At the same time, the recording process is started in a step S35, i.e., an electrostatic latent image is formed on the recording paper by the recording head 2, and then developed into a visible image by the developing unit 3. When the recording paper enters the cutting unit 5, the inlet and feed roller assemblies 6, 7 slip on the recording paper as they rotate at a peripheral speed slightly higher than the peripheral speed of the feed rollers 4, thus eliminating any slack of the recording paper and aligning the recording paper longitudinally between the feed rollers 4 and the cutting unit 5. Upon further insertion of the recording paper into the cutting unit 5 by the feed rollers 4, opposite longitudinal margins 26 (FIG. 10) are cut off the recording paper by the rotary cutting blades 19, 20 on the opposite sides of the cutting unit 5. The recording paper from which the opposite longitudinal margins 26 have been cut off is directed onto the first stacker 12.

In the absence of any image on the recording paper in the cutting unit 5, the plotter control unit 22 issues, at constant periods of time, a cutting signal to cut off the recording paper in the transverse direction, i.e., the Y direction, into a waste sheet 25 having an A4 size or a shorter size. The waste sheet 25 is a waste length of the recording paper which is free of images or between adjacent images. When the cutting signal is issued, if the leading end of the image recorded on the recording paper has not reached the Y-direction cutter 9 yet in a step S36 (FIG. 5), then control goes to a step S37 which determines whether the waste length of the recording paper is of an A4 size or not. If the waste length is of an A4 size, then the inlet and feed roller assemblies 6, 7 are stopped as by disengaging the clutches 61, 72 in a step S38, and the brake 62 is applied in a step S39 to stop the movement of the recording paper. Then, the rotary cutting blade 91 is moved in the Y direction to cut off the waste length ahead of the image as a waste sheet 25 from the recording paper in a step S40. Thereafter, the feed roller assembly 7 is actuated to feed the waste sheet 25 onto the first stacker 12 in a step S41. When the trailing end of the waste sheet 25 has passed beyond the cutter sensor 74 in a step S42, the brake 62 is released in a step S43, and the clutch 61 is engaged to start rotating the inlet roller assembly 6 in a step S44.

Figure 11:
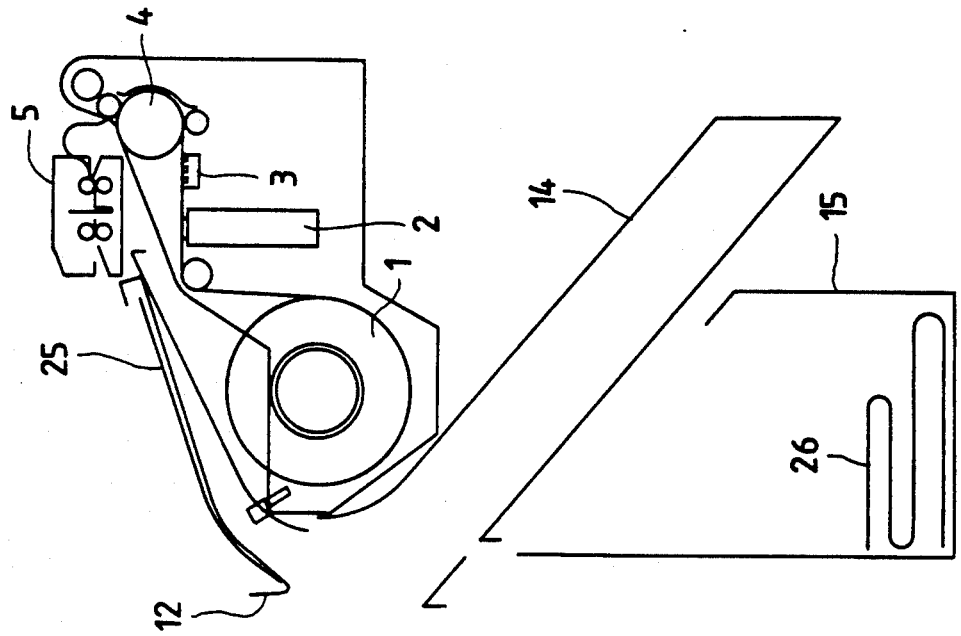
FIG. 11 is a schematic vertical cross-sectional view illustrative of the manner in which the opposite longitudinal margins and a waste sheet are discharged after they have been cut off.
Figure 12:
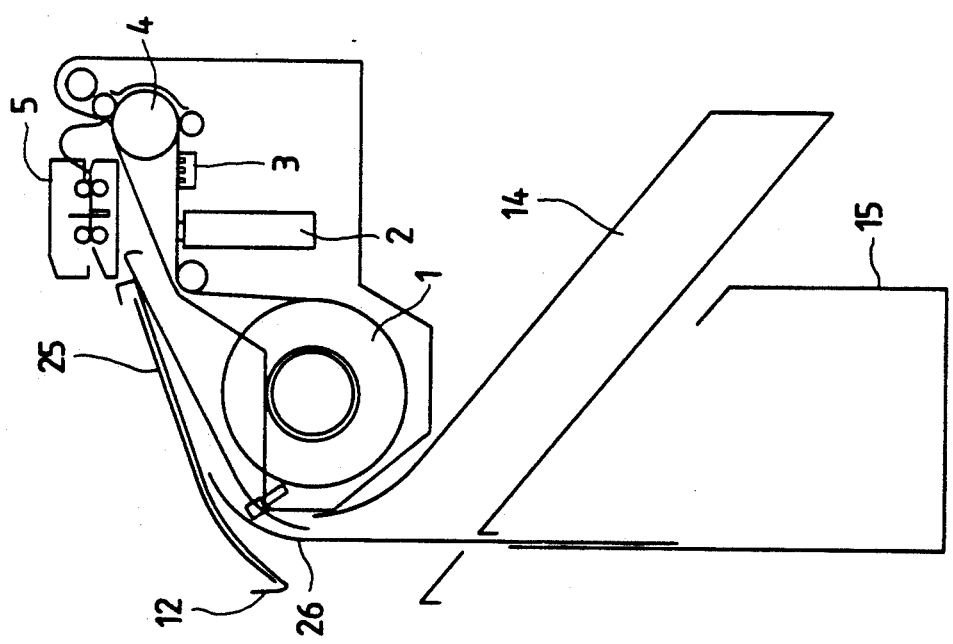
FIG. 12 is a schematic vertical cross-sectional view illustrative of the manner in which the opposite longitudinal margins and the waste sheet are stored in respective stackers.

The visible image is cut off in a size that is indicated by a size signal issued from the plotter control unit 22. More specifically, when a signal to cut off the recording paper in the X and Y directions is transmitted, together with an image signal, from a CAD system (not shown) to the plotter control unit 22, the plotter control unit 22 starts to measure the time until the leading end of the image recorded on the recording paper reaches the the Y-direction cutter 9. If the leading end of the image recorded on the recording paper has reached the the Y-direction cutter 9 in step S36, then the inlet and feed roller assemblies 6, 7 are stopped in a step S45, and the brake 62 is applied in a step S46 to stop the movement of the recording paper. Then, the rotary cutting blade 91 is moved in the Y direction to cut off the waste length ahead of the image as a waste sheet 25 from the recording paper in a step S47. Thereafter, the feed roller assembly 7 is actuated to feed the waste sheet 25 onto the first stacker 12 in a step S48. A step S49 confirms whether the trailing end of the waste sheet 25 has passed beyond the cutter sensor 74. FIGS. 11 and 12 show that the waste sheet 25 is received on the first stacker 12 and the margins 26 are stored in the margin stacker 15.

Figure 13:
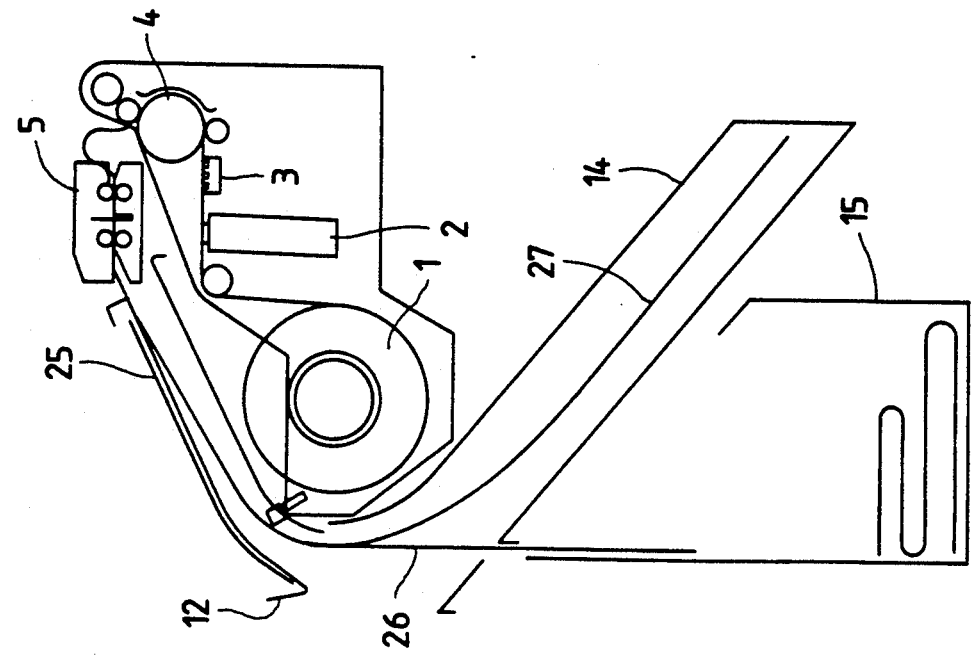
FIG. 13 is a schematic vertical cross-sectional view illustrative of witching from a first stacker to a second stacker.

Then, a cutting process is started to cut off the recording paper with the recorded image thereon. The rotary cutting blades 19 positioned on the opposite sides and depending on the size to which the recording paper is to be cut off are lowered and set in position in a step S50. The size to which the recording paper is to be cut off is transmitted from the system to the plotter control unit 22. If the size is an A3 or A4 size, the first stacker 12 remains selected, and if the size is an A2, A1, or A0 size, then the first stacker 12 is lifted to select the second stacker 14 so that a discharged sheet from the cutting unit 5 is directed toward the second stacker 14. Such selection of the first stacker 12 or the second stacker 14 is effected by controlling the sheet path selector motor 75 (FIG. 3) in a step S51. FIG. 13 shows the first stacker 12 lifted to select the second stacker 14. After elapse of a certain period of time, the brake 62 is released in a step S52, and the clutch 61 is engaged to start rotating the inlet roller assembly 6 to feed the recording paper into the cutting unit 5 in a step S53. The recording paper with the image recorded therein moves through the cutting unit 5 its longitudinal margins are being cut off in the longitudinal direction, i.e., X direction by the X-direction cutter.

The brake 62 is released after elapse of a certain period of time in the step S52 because cut sheets will be discharged from the cutting unit 5 at certain intervals of time and will not be jammed in the first and second stackers 12, 14.

Then, if the recording process has not been finished yet in a step S54 and if the plotter control unit 22 confirms that the the trailing end of the image has reached the Y-direction cutter 9 in a step S55, then the inlet and feed roller assemblies 6, 7 are stopped in a step S56 and then the brake 62 is applied in a step S57 to stop the movement of the recording paper in the cutting unit 5. Thereafter, the Y-direction cutter 9 is actuated to move the rotary cutting blade 91 in the Y direction thereby cutting off the recording paper in a step S58.

Figure 14:
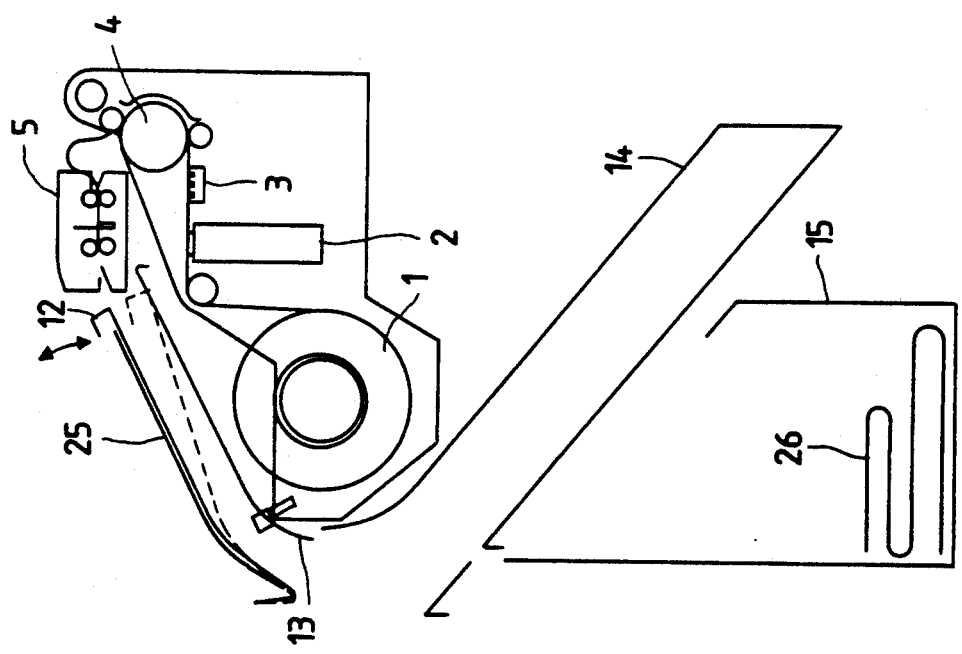
FIG. 14 is a schematic vertical cross-sectional view illustrative of the manner in which a cut sheet with an image recorded thereon is discharged into the second stacker.
Figure 15:
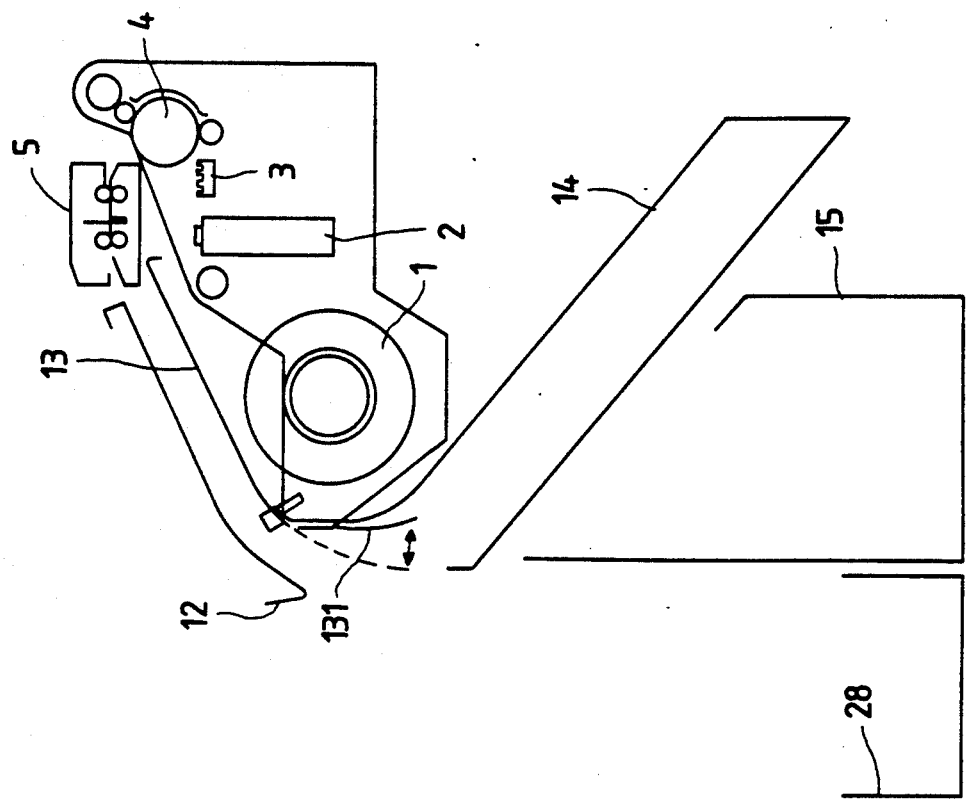
FIG. 15 is a schematic vertical cross-sectional view illustrative of the manner in which the cut sheet with an image recorded thereon is stored in the second stacker.

After the recording paper has been cut off in the Y direction, the inlet roller assembly 6 is disabled and the feed roller assembly 7 starts to rotate in a step S59 thus discharging the cut sheet out of the cutting unit 5. If the leading end of the discharge sheet is detected by the cutter sensor in a S60, the cutting blades 19 are lowered and set in position in a step S61 and the first stacker 12 or the second stacker 14 is selected in a step S62. After a certain period of time has elapsed, the brake 62 is released in a step S71, and the inlet assembly 6 is rotated to introduce the recording paper into the cutting unit 5 again in step S72. In FIG. 14, the waste sheet 25 is stored in the first stacker 12, a cut sheet 27 with the recorded image is introduced into the second stacker 14, and the cut opposite longitudinal margins 26 are introduced into the margin stacker 15. In FIG. 15, the waste sheet 25, the cut sheet 27, and the cut margins 26 have been stored respectively in the stackers 12, 14, 15.

After all desired images have been recorded on respective sheets of recording paper, control goes from the step S54 to a step S63 in which the recording head 2 stops recording any images on the recording paper in a step S64. If the plotter control unit 22 confirms that the final latent image has been developed by the developing unit 3 and the trailing end of the final developed image has reached the Y-direction cutter 9 in the step S64, then the inlet and feed roller assemblies 6, 7 are stopped in a step S65 and then the brake 62 is applied in a step S66 to stop the movement of the recording paper in the cutting unit 5. Thereafter, the Y-direction cutter 9 is actuated to move the rotary cutting blade 91 in the Y direction thereby cutting off the recording paper in a step S67. Then, the feed roller assembly 7 starts to rotate in a step S68 thus discharging the cut sheet out of the cutting unit 5. Upon confirming that the trailing end of the discharge sheet is detected by the cutter sensor in a step S69, the plotter control unit 22 stops the operation of the electrostatic plotter in a step S70.

The image recording apparatus thus constructed is advantageous in that since the roll 1 of recording paper is positioned near the operator and cut sheets are discharged towards the operator, the operator can easily supply a new roll of recording paper and pick up discharged sheets. The image recording apparatus may be installed in a relatively small space because no stackers are disposed on the operator side of the apparatus. The image recording apparatus automatically sorts discharged sheets according to size and sorts out waste sheets between recorded images.

In the above first embodiment, the first and second stackers 12, 14 are employed to store waste sheets and recorded sheets, respectively. The first stackers 12 may be arranged to have two selectable bins, one of which may be used to store waste sheets.

Figure 16:
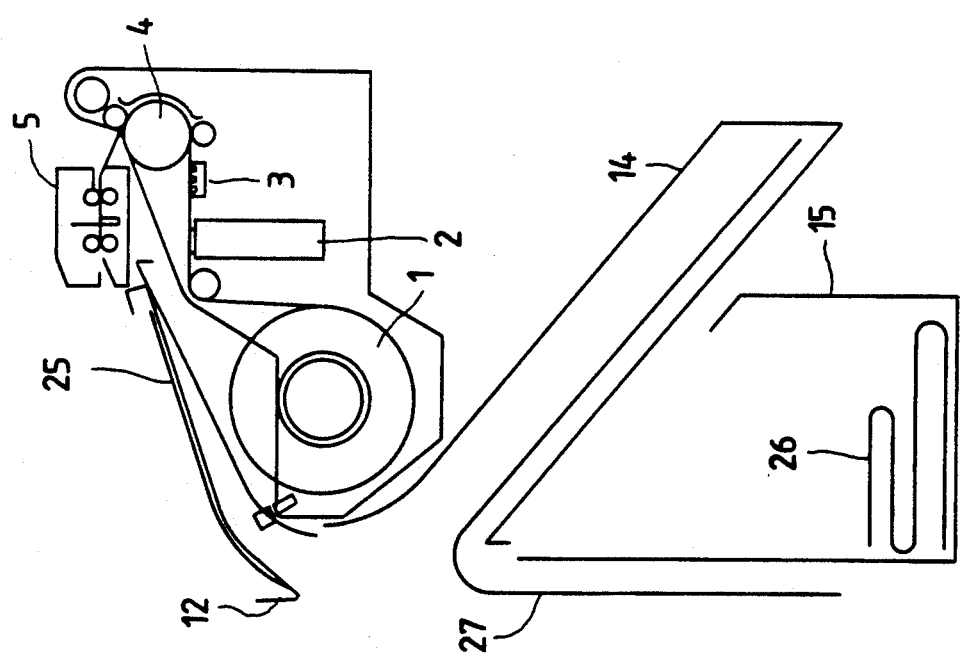
FIG. 16 is a schematic vertical cross-sectional view of an image recording apparatus according to a second embodiment of the present invention.
Figure 18:
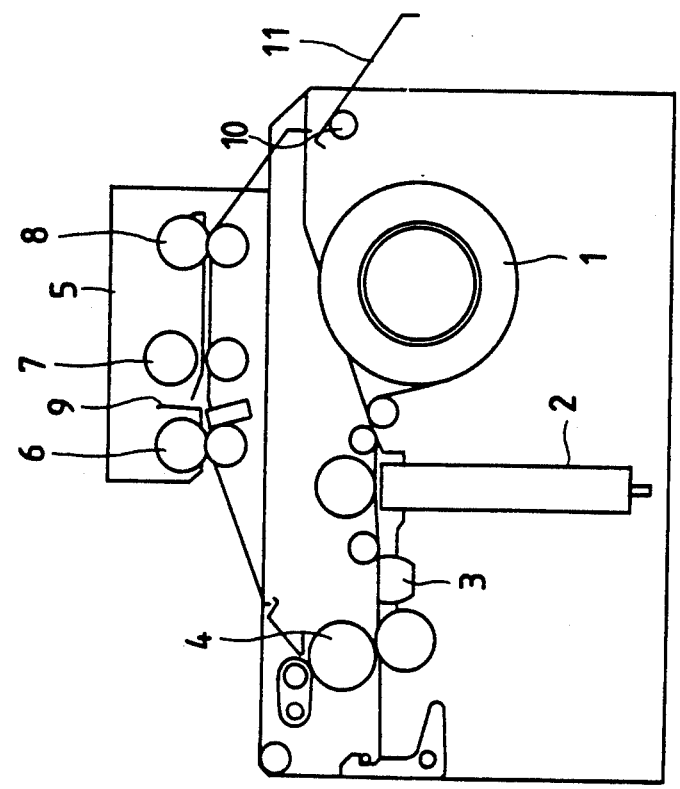
FIG. 18 is a schematic vertical cross-sectional view of a conventional electrostatic plotter as an image recording apparatus.

FIG. 16 shows an image recording apparatus according to a second embodiment of the present invention. The image recording apparatus shown in FIG. 16 is similar to the image recording apparatus according to the first embodiment except that it additionally has a third stacker 28 for receiving discharged sheets, and a flap 131 swingably mounted on the lower end of the guide 13. The flap 131 is angularly movable, by the size signal from the plotter control unit 22 (FIG. 3), between solid- and dotted-line positions for directing discharged sheets selectively into the second and third stackers 14, 28. When a large number of sheets with recorded images are to be produced by the image recording apparatus, the flap 131 is first angularly positioned in the solid-line position to direct a certain number of sheets into the second stacker 14. After the sheets have been stored in the second stacker 14, the flap 131 is actuated into the dotted-line position to discharge a remaining number of sheets into the third stacker 28. The image recording apparatus with the additional third stacker 28 is particularly advantageous when it is required to discharge a large number of successive sheets with recorded sheets and no operator is available to attend to the apparatus as during night. The discharged sheets can therefore neatly stored in the stackers 14, 28. Since no operator is present, the third stacker 28 may be positioned on the operator side of the apparatus.

Figure 17:
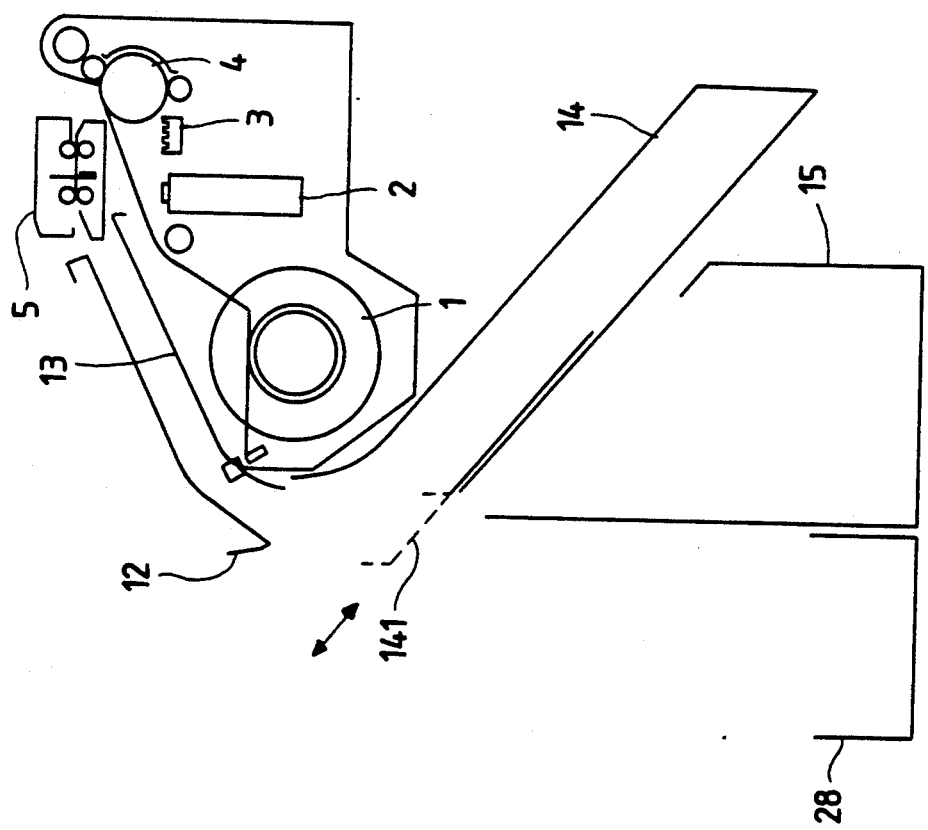
FIG. 17 is a schematic vertical cross-sectional view of an image recording apparatus according to a third embodiment of the present invention.
Figure 19:
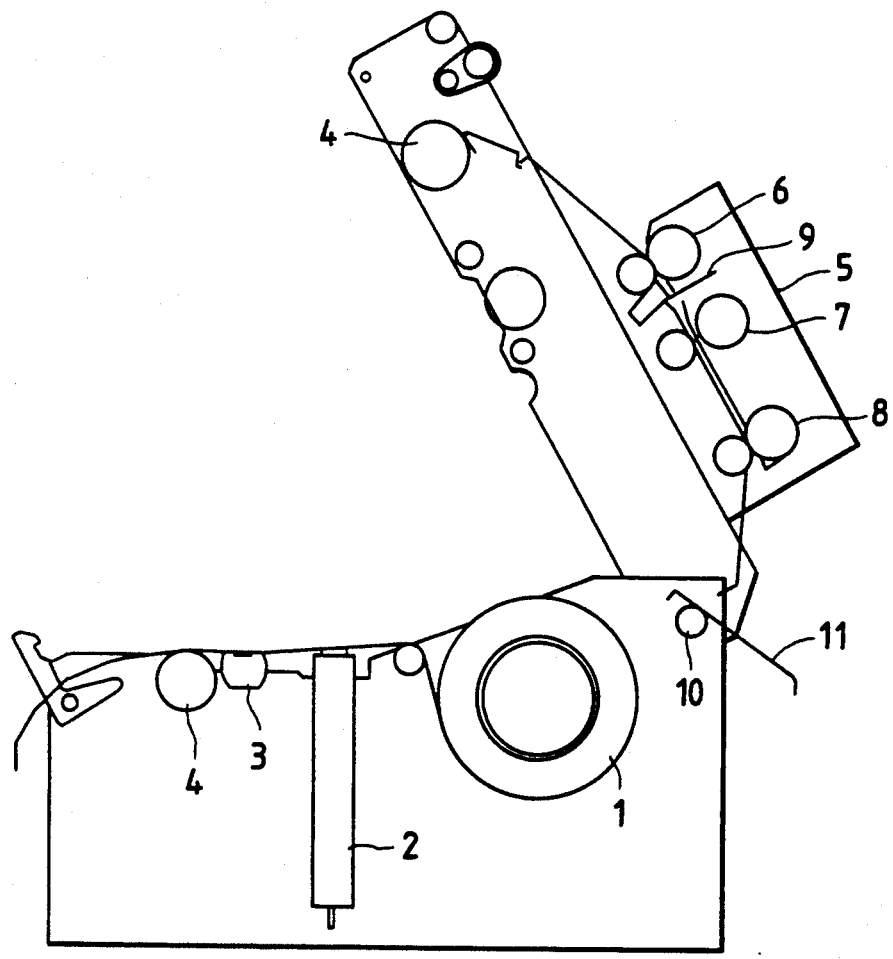
FIG. 19 is a schematic vertical cross-sectional view of the conventional electrostatic plotter with an upper frame and a cutting unit thereof being moved upwardly for setting a roll of recording paper.

FIG. 17 shows an image recording apparatus according to a third embodiment of the present invention. The image recording apparatus shown in FIG. 17 differs from the image recording apparatus according to the second embodiment in that no flap 131 is employed, but a slide plate 141 is slidably disposed on a lower wall of the second stacker 14 at its inlet. The slide plate 141 is slidable, under the control of the plotter control unit 22 (FIG. 3), between a dotted-line position in which it guides discharged sheets into the second stacker 14 and a solid-line position in which it allows discharged sheets to be directed into the third stacker 28.

Although certain preferred embodiments of the present invention have been shown and described in detail, it should be understood that various changes and modifications may be made therein without departing from the scope of the appended claims.

We claim as our invention:

1. An electrostatic image recording apparatus for recording an image on a roll of recording paper, comprising:
   a housing having a side to be confronted by an operator;
   a roll of recording paper disposed in said housing near said side;
   a recording head disposed in said housing for recording a latent image on a recording paper supplied from said roll of recording paper;
   a developing unit disposed in said housing for developing the latent image recorded on the recording paper into a visible image; and
   a cutting unit mounted on said housing for cutting off a sheet with the developed visible image thereon from the recording paper and discharging the cut sheet toward said side of the housing;
   said cutting unit being hingedly connected to said housing at an opposite side remote from said side.

2. An electrostatic image recording apparatus for recording an image on a roll of recording paper, comprising:
   a housing having a side to be confronted by an operator;
   a roll of recording paper disposed in said housing near said side;
   a recording head disposed in said housing for recording a latent image on a recording paper supplied from said roll of recording paper;
   a developing unit disposed in said housing for developing the latent image recorded on the recording paper into a visible image;
   a cutting unit mounted on said housing for cutting off a sheet with the developed visible image thereon from the recording paper and discharging the cut sheet toward said side of the housing;
   a first stacker, being disposed at an upper position in said housing, for storing cut sheets smaller than a predetermined size; and
   a second stacker, being disposed at a lower position in said housing, for storing cut sheets of, and greater than, said predetermined size.

3. An electrostatic image recording apparatus according to claim 2, wherein said first stacker stores waste sheets cut off from the elongate recording paper as image-free lengths between adjacent recorded images by said cutting means, in addition to said cut sheets smaller than said predetermined size.

4. An electrostatic image recording apparatus for recording an image on a roll of recording paper, comprising:
   image forming means for forming images to be recorded on said recording paper;
   cutting means for cutting a sheet from said recording paper being image-formed by said image forming means;
   first and second stackers for storing sheets cut off by said cutting means;
   said second stacker having storage capacity greater than that of said first stacker;
   said sheet cut off by said cutting means to be stored in said first stacker unless said first stacker is filled with a predetermined number of sheets, said sheet cut off by said cutting means then being stored in said second stacker.

5. An electrostatic image recording apparatus according to claims 4, wherein said second stacker is disposed in a housing of said apparatus.

6. An electrostatic image recording apparatus for recording an image on a roll of recording paper, comprising:
- a housing having a side to be confronted by an operator;
- a roll of recording paper disposed in said housing near said side;
- a recording head disposed in said housing for recording a latent image on a recording paper supplied from said roll of recording paper;
- a developing unit disposed in said housing for developing the latent image recorded on the recording paper into a visible image;
- a cutting unit mounted on said housing for cutting off a sheet with the developed visible image thereon from the recording paper and discharging the cut sheet toward said side of the housing;
- first and second stackers for storing cut sheets being cut off by said cutting unit;
- said cutting unit being hingedly connected to said housing at an opposite side remote from said side;
- said second stacker having storage capacity greater than that of said first stacker; and
- said sheet cut off by said cutting unit to be stored in said first stacker unless said first stacker is filled with a predetermined number of sheets, said sheet cut off by said cutting unit then being stored in said second stacker.

7. An electrostatic image recording apparatus according to claim 6, wherein said second stacker is disposed in a housing of said apparatus.

* * * * *